Feb. 2, 1965 C. V. JAKOWATZ 3,168,645

QUANTIZED-ANALOGUE MULTIPLIER

Filed Oct. 6, 1960

Inventor:
Charles V. Jakowatz,
by Richard R. Brainard
His Attorney.

United States Patent Office 3,168,645

Patented Feb. 2, 1965

3,168,645
QUANTIZED-ANALOGUE MULTIPLIER

Charles V. Jakowatz, Schenectady, N.Y., assignor to General Electric Company, a corporation of New York Filed Oct. 6, 1960, Ser. No. 60,991
10 Claims. (Cl. 235—194)

Figures 1, 2:
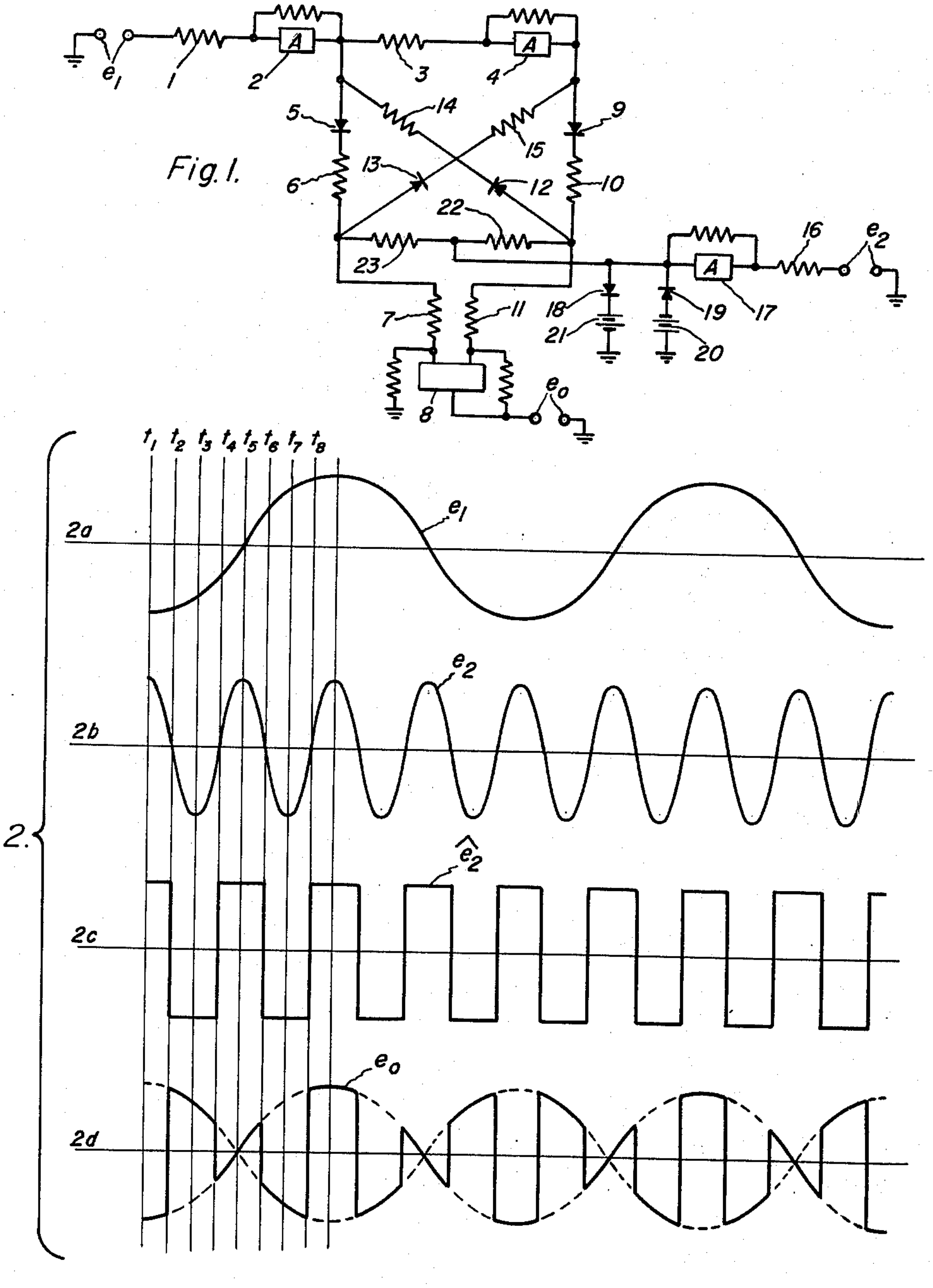

The present invention relates to multiplier circuits and more particularly to a circuit for multiplying an analogue signal by a quantized signal.

In many applications it is desirable to provide a circuit which will multiply an analogue voltage by a quantized voltage. As one example of an application in which such a multiplier may be used reference should be made to my copending application entitled: "Adaptive Filter" filed February 8, 1960, Serial No. 7,276, now Patent No. 3,114,884 and assigned to the assignee of this application. In the adaptive system shown in that application a plurality of multipliers, each of which multiplies the analogue voltage on a storage capacitor by the analogue voltage on a sampling capacitor, are used. The multipliers are used to determine a least mean square distance measure between an incoming signal which is sampled by the sampling capacitors and the contents of storage as represented by the voltage on the storage capacitors. In the adaptive filter this is equivalent to carrying out the operation $\vec{X}.\vec{M}_i$ where $\vec{X}$ is an $n$ dimensional vector of incoming information. That is, there are $n$ sampling capacitors used to sample the incoming voltage. Correspondingly $\vec{M}$ is an $n$ dimensional vector corresponding to $n$ storage capacitors in the system. This dot product is compared with a threshold value depending upon a parameter determined by a maximum value previously assumed by the dot product and the elapsed time between peaks in the dot product. In making this comparison it is necessary to determine when:

$$\overline{X}.\overline{M}\geqslant\theta(k)e^{-at}$$

where $\theta(k)$ is a threshold value, $e^{-at}$ is the time weighting of the peak value of $\theta(k)$ and $k$ is an index on appropriate sequences of maximum values.

In using analogue multipliers to obtain the dot product referred to above a serious cost problem is presented in the instrumentation of the Adaptive Filter. While it may be feasible under certain circumstances to use strictly quantized multipliers which are considerably less expensive than analogue multipliers, this solution is not entirely satisfactory. In such a system each of the inputs to the multiplier would be quantized, for example, to a plus one and a minus one level depending upon whether the inputs are positive or negative. Such a quantization of both inputs to the multiplier would seriously affect the manner in which the value of $\theta(k)$ is formed since this value depends upon the analogue information stored in the storage capacitors. In addition, the quantization of an input to only two levels destroys information indicative of either or both of the inputs being zero. Because of this it is quite desirable to provide a multiplier which will produce an output indicative of the analogue information in storage and yet at the same time operate on a quantized method of operation to avoid the complexities of analogue multipliers. Such a quantized method of operation should include at least three levels of quantization.

Accordingly, it is an important object of the present invention to provide an improved multiplier circuit to multiply an analogue input voltage by a quantized input voltage.

It is another object of the present invention to provide a simple circuit which can be used to produce a correlation function in an adaptive filter.

It is another object of the present invention to provide a multiplier which produces an output having three levels of quantization.

These and other objects and advantages of the present invention will become more apparent from the following description and accompanying claims taken in conjunction with the drawings in which:

FIGURE 1 which shows a circuit diagram of the analogue-quantized multiplier of the present invention, and FIGURE 2 shows waveforms depicting the operation of the multiplier of the present invention.

In accordance with one embodiment of the invention an analogue input voltage is applied to two cascaded D.C. amplifiers. These amplifiers supply two output voltages one of which is proportional to the input voltage and the other of which is proportional to the input voltage but 180 degrees out of phase with the input voltage. These two output voltages are connected to two pairs of diodes which gate the two proportional analogue voltages to the two inputs of a difference amplifier. The two pairs of diodes are gated in such a manner that only one pair conducts at a particular time. One pair of gating diodes connects the two proportional output voltages to the difference amplifier in one sense and the other pair of diodes connects the two proportional output voltages to the difference amplifier in the opposite sense. The diodes are gated on and off by a quantized value of the second input voltage to the multiplier. This second input voltage to the multiplier is quantized by means of a high gain D.C. amplifier which is driven into saturation. The output of this amplifier gates the two pairs of diodes.

Referring to FIGURE 1, one of the input voltages is applied through an input resistor 1 to a D.C. amplifier 2. The output of amplifier 2 is proportional to the input voltage $e_1$ but is 180 degrees out of phase with the input voltage. The output of D.C. amplifier 2 is connected through a resistor 3 to a second D.C. amplifier 4. The output of amplifier 4 is also proportional to the input voltage $e_1$ and is in phase with the input voltage.

The output of amplifier 2 is connected through a diode 5 and resistors 6 and 7 to one input to a difference amplifier 8. In order to connect the output of amplifier 4 to the other input to difference amplifier 8, a diode 9, resistor 10 and resistor 11 are connected in series between the output of amplifier 4 and the second input to difference amplifier 8. Diodes 5 and 9 form the first pair of gating diodes and when these diodes are conducting a signal proportional to the first input voltage is applied to the right hand input terminal of difference amplifier 8 and a signal proportional to, but 180 degrees out of phase with, the input signal is applied to the left hand input terminal of difference amplifier 8. Difference amplifiers are well known in the art and amplifier 8 may, for example, be of the type described on page 7, FIGURE 24 of Application Manual for Philbrick Octal Plug-In Computing Amplifier (GAP/R) K2 Services, copyright 1956 by George A. Philbrick Researches, Inc.

The second pair of gating diodes includes the diodes 12 and 13. When this second pair of diodes is conducting the output of amplifier 2 is connected through a resistor 14, diode 12 and resistor 11 to the right hand input of difference amplifier 8. Similarly, the output of D.C. amplifier 4 is connected through resistor 15, diode 13 and resistor 7 to the left hand input to difference amplifier 8.

In order to gate the two pairs of diodes on and off the second input voltage, designated $e_2$ is quantized and applied to the diodes in such a manner that only one pair of diodes is conducting at a time. The second input voltage $e_2$, is applied through an input resistor 16 to a D.C. amplifier 17. Amplifier 17 is a high gain D.C. amplifier and is driven into saturation. That is, the amplifier quickly reaches saturation in the positive direction when the input voltage is positive and quickly reaches saturation in the negative direction when the input voltage is negative. In order to limit the quantized voltage between fixed limits, diodes 18 and 19 are provided. As shown in the subject embodiment the diode 19 is connected to a negative six volt source of potential 20 and the diode 18 is connected to a positive six volt source of potential 21. In this manner, the output of amplifier 17 is clipped at −6 volts and +6 volts.

In order to gate the two pairs of diodes on and off the output of amplifier 17 is connected through a resistor 22 to the junction of diodes 9 and 12 and through a resistor 23 to the junction of diodes 5 and 13. When the output of amplifier 17 is positive the pair of diodes 12 and 13 are biased in the conducting direction and the pair of diodes 5 and 9 are biased in the non-conducting condition. Conversely when the output of amplifier 17 is negative diodes 5 and 9 are conducting and diodes 12 and 13 are non-conducting.

The operation of the quantized-analogue multiplier of the present invention can best be explained with reference to the waveform diagrams of FIGURE 2. In describing the operation it will be assumed that the input $e_1$ is a sine wave as shown in FIGURE 2*a* and the input $e_2$ is a sine wave as shown in FIGURE 2*b*. The output of amplifier 17, designated $\hat{e}_2$ is shown in FIGURE 2*c*. This is the quantized value of $e_2$.

Between times $t_2$ and $t_4$ the output of amplifier 17 is negative as seen in FIGURE 2*c*. During this time period the diodes 5 and 9 are biased in the forward direction and diodes 12 and 13 are biased in the reverse direction. Because of this, diodes 5 and 9 respectively connect the outputs of amplifiers 2 and 4 to the inputs of the difference amplifier 8. The output of difference amplifier 8 is shown as $e_0$ in FIGURE 2*d* and during time period $t_2$–$t_4$ is shown as a positive quantity. At $t_4$ the voltage $\hat{e}_2$ switches to its positive value. At this time the diodes 12 and 13 become conducting and the diodes 5 and 9 are cut off. Diodes 12 and 13 connect the output of amplifiers 2 and 4 respectively to the right and left hand inputs to difference amplifier 8. The resultant output of difference amplifier 8 is as shown between time periods $t_4$ and $t_6$. The operation of the Quantized-Analogue Multiplier proceeds as shown in FIGURE 2 with the output $e_0$ being as shown in FIGURE 2*d*.

An important characteristic of the subject circuit is that when either of the inputs $e_1$ or $e_2$ is zero the output, $e_0$, will be zero. All of the outputs of the multiplier, including the zero outputs, can be summarized by the following table:

*Table 1*

| | | | | | | |
|---|---|---|---|---|---|---|
| $e_1$ | + | 0 | + | − | − | + |
| $e_2$ | 0 | + | − | + | − | + |
| $e_0$ | 0 | 0 | − | − | + | + |

By referring to Table 1 above it can be seen that the output of the multiplier is quantized to three levels, +, 0, and −. This three level quantization provides additional information as to whether or not a signal is present at the input to the system when the multiplier is used in an adaptive filter.

While a specific embodiment of the present invention has been shown and described, it will, of course, be understood that certain other modifications may be made. The appended claims are, therefore, intended to cover any such modifications within the true spirit and scope of the invention.

What I claim as new and desire to secure by Letters Patent of the United States is:

1. A quantized-analogue multiplier for producing an output indicative of the product of first and second analogue input voltages comprising means for producing a third voltage proportional to said first input voltage, means for producing a fourth voltage proportional to and 180° out of phase with said third voltage, means for quantizing said second input voltage, a difference amplifier, a first pair of diodes, said first pair of diodes connecting said third and said fourth voltages to said difference amplifier in a polarity sense, a second pair of diodes, said second pair of diodes connecting said third and said fourth voltages to said difference amplifier in the opposite polarity sense, said quantizing means being connected to said first and said second pairs of diodes, said first and said second pairs of diodes being selectively rendered conducting and non-conducting by said quantizing means whereby the output of said difference amplifier is the product of said first input voltage and said second input voltage quantized.

2. A quantized-analogue multiplier for producing an output indicative of the product of first and second analogue input voltages comprising a first D.C. amplifier, producing an output voltage proportional to and 180° out of phase with said first analogue input voltage, a second D.C. amplifier connected in cascade with said first D.C. amplifier, said second D.C. amplifier producing a voltage proportional to said first input voltage, a difference amplifier having two inputs, a first pair of diodes, said first pair of diodes connecting the outputs of said first and said second D.C. amplifiers to said two inputs to said difference amplifier in one sense, a second pair of diodes, said second pair of diodes connecting the outputs of said first and said second D.C. amplifiers to said two inputs to said difference amplifier in the opposite sense, means for quantizing said second input voltage, said quantizing means being connected to said first and said second pairs of diodes, said first and said second pairs of diodes being selectively rendered conducting and non-conducting by said quantizing means whereby the output of said difference amplifier is the product of said first input voltage and said second input voltage quantized.

3. The quantized-analogue multiplier recited in claim 2 wherein the means for quantizing said second input voltage includes a D.C. amplifier, said D.C. amplifier being driven to saturation by said second input voltage, a first clamping diode, a source of positive reference voltage, said first clamping diode being connected between the output of said D.C. amplifier and said source of positive reference voltage to establish a positive quantization level, a second clamping diode, a source of negative reference voltage, said second clamping diode being connected between the output of said D.C. amplifier and said source of negative reference voltage to establish a negative level of quantization, the output of said D.C. amplifier being the quantized value of said second analogue input voltage.

4. A quantized-analogue multiplier for producing an output indicative of the product of first and second analogue input voltages comprising a first D.C. amplifier, said first D.C. amplifier producing an output proportional to and 180° out of phase with said first input voltage, a second D.C. amplifier connected in cascade with said first D.C. amplifier, said second D.C. amplifier producing an output proportional to said first input voltage, a difference amplifier having two inputs, a first conducting path including first and second diodes, the output of said first D.C. amplifier being connected to the anode of said first diode, the output of said second D.C. amplifier being connected to the anode of said second diode, the cathodes of said first and said second diodes each being connected to one input to said difference amplifier, a second conducting path including third and fourth diodes, the cathode of said third diode being connected to the output of said first D.C. amplifier, the cathode of said fourth diode being connected to the output of said second D.C. amplifier, the anodes of said third and said fourth diodes each being connected to one input to said difference amplifier, means for quantizing said second input voltage, said quantizing means being connected to said first and said second conducting paths, said first and said second conducting paths being selectively rendered conducting and non-conducting by said quantizing means whereby the output of said difference amplifier is the product of said first input voltage and said second input voltage quantized.

5. The quantized-analogue multiplier recited in claim 4 wherein the means for quantizing said second analogue input voltage includes a D.C. amplifier, said D.C. amplifier being driven into saturation by said second analogue input voltage, a first clamping diode, a source of positive reference voltage, the output of said difference amplifier being connected through said first clamping diode to said source of positive reference voltage to establish a positive quantization level, a second clamping diode, a source of negative reference voltage, the output of said D.C. amplifier being connected through said second diode to said source of negative reference voltage to establish a negative quantization level, the output of said D.C. amplifier being the quantized value of said second analogue input voltage.

6. The quantized-analogue multiplier recited in claim 5 including first and second resistors and wherein the quantized value of said second analogue input voltage is connected through said first resistor to the cathode of said first diode and to the anode of said fourth diode and the quantized value of said second analogue input voltage is connected through said second resistor to the cathode of said second diode and the anode of said third diode wherein said first and second diodes are rendered conducting when the quantized value of said second analogue input voltage is at a negative level of quantization and said third and fourth diodes are rendered conducting when the quantized value of said second analogue input voltage is at a positive level of quantization.

7. A multiplier for producing a product between an analogue voltage and a quantized voltage comprising a pair of input terminals and input means for delivering said analogue voltage in opposite polarity senses to said input terminals including a first D.C. amplifier responsive to said analogue voltage for delivering said analogue voltage to a first of said input terminals in a first polarity sense and a second D.C. amplifier responsive to said analogue voltage for delivering said analogue voltage to a second of said input terminals in the opposite polarity sense, a pair of output terminals, a terminal for receiving said quantized voltage, coupling means consisting of a single diode ring coupling said input terminals to conjugate output terminals and responsive to the direction of said quantized voltage for coupling the opposite polarity input signals from said input terminals to the respective output terminals with a polarity determined by said quantized voltage, wherein said diode ring includes four diodes similarly poled around said ring, and differentially responsive means coupled to said output terminals.

8. A multiplier for producing a product between an analogue voltage and a quantized voltage comprising a pair of input terminals and means for applying said analogue voltage in an opposite polarity sense to said input terminals including a first D.C. amplifier providing the analogue voltage in a first polarity sense driving a second D.C. amplifier providing the analogue voltage in a second polarity sense, first and second output terminals, coupling means including a pair of asymmetric conductors for coupling the first of said output terminals to each of said input terminals each asymmetric conductor providing coupling in an opposite polarity sense, coupling means including a second pair of asymmetric conductors for coupling said second output terminal to each of said input terminals each asymmetric conductor providing coupling in an opposite polarity sense, said asymmetric conductors forming a bridge circuit with each asymmetric conductor having the same polarity orientation around the bridge, a terminal for receiving said quantized voltage and a pair of impedances connecting in common said output terminals to said last-mentioned terminal.

9. A multiplier comprising a pair of input terminals, means providing an input signal in opposite polarity sense to said input terminals, a pair of output terminals, a circuit including a diode between each input terminal and each output terminal forming a serial loop wherein each diode is oriented with the same polarity around the loop, means for quantizing a second signal, a common terminal for receiving said second signal as quantized, a pair of resistances coupling said common terminal to each of said output terminals, and differentially responsive means coupled to said output terminals for delivering a portion of said input signal with a relative polarity dependent upon the relative polarity of said second signal.

10. The apparatus of claim 9 wherein said means for quantizing said second signal comprises limiting means, said limiting means comprising a high gain amplifier receving a second signal and providing an output to a pair of biased, oppositely-poled diodes coupled across said common terminal.

References Cited in the file of this patent

UNITED STATES PATENTS

| | | |
|---|---|---|
| 2,455,732 | Carter | Dec. 7, 1948 |
| 2,728,042 | Ruhland | Dec. 20, 1955 |
| 2,842,744 | Frank | July 8, 1958 |
| 2,978,179 | Curtis | Apr. 4, 1961 |
| 3,011,129 | Magleby | Nov. 28, 1961 |